United States Patent
Flatt et al.

(10) Patent No.: US 8,616,080 B2
(45) Date of Patent: Dec. 31, 2013

(54) SHUTTLE STOP FORCE LIMITER

(75) Inventors: James E. Flatt, Marshall, MI (US); Ted Alexander McKay, Foothill Ranch, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 852 days.

(21) Appl. No.: 12/710,959

(22) Filed: Feb. 23, 2010

(65) Prior Publication Data

US 2010/0213310 A1   Aug. 26, 2010

Related U.S. Application Data

(60) Provisional application No. 61/154,476, filed on Feb. 23, 2009.

(51) Int. Cl.
*B64C 13/34* (2006.01)
*F16H 1/16* (2006.01)
*B64C 13/50* (2006.01)

(52) U.S. Cl.
CPC . *B64C 13/50* (2013.01); *F61H 1/16* (2013.01)
USPC .......... 74/425; 74/89.37; 74/89.38; 244/99.2; 244/99.9

(58) Field of Classification Search
USPC ............ 244/99.2, 99.9; 74/89.37–89.39, 352, 74/425; 188/134; 91/174; 239/722
IPC ........................................................ F61H 55/22
See application file for complete search history.

(56) References Cited

U.S. PATENT DOCUMENTS

| | | | |
|---|---|---|---|
| 209,591 A | 5/1878 | Stoddard | |
| 2,979,034 A * | 4/1961 | Geyer | 92/17 |
| 3,523,599 A * | 8/1970 | Denkowski | 192/150 |
| RE29,000 E * | 10/1976 | Ifield et al. | 91/174 |
| 4,100,973 A * | 7/1978 | Freudenthal | 173/44 |
| 4,124,228 A | 11/1978 | Morrison | |
| 4,318,304 A * | 3/1982 | Lang | 74/89.38 |
| 4,459,867 A * | 7/1984 | Jones | 74/89.38 |
| 4,776,617 A | 10/1988 | Sato | |
| 4,784,410 A | 11/1988 | Peppel et al. | |
| 5,174,662 A * | 12/1992 | Harvey | 384/611 |
| 5,655,636 A * | 8/1997 | Lang et al. | 192/223 |
| 5,743,490 A * | 4/1998 | Gillingham et al. | 244/99.9 |
| 6,056,499 A * | 5/2000 | Bressner | 414/621 |
| 6,202,803 B1 * | 3/2001 | Lang | 188/134 |
| 6,237,863 B1 * | 5/2001 | Smith | 239/722 |
| 6,273,476 B1 | 8/2001 | Ikeda et al. | |
| 6,854,486 B2 | 2/2005 | Challender | |
| 7,721,616 B2 * | 5/2010 | Augustine et al. | 74/352 |

(Continued)

FOREIGN PATENT DOCUMENTS

GB  2 379 490 A * 3/2003 ............. F16H 55/22

*Primary Examiner* — Vinh Luong

(74) *Attorney, Agent, or Firm* — Renner, Otto, Boisselle & Sklar, LLP

(57) ABSTRACT

Provided is an actuator characterized by the use of a shuttle that shifts in response to an overload. The shuttle is movable axially relative to a rotary input member by continued rotation of the rotary input member so that a stop on the shuttle moves from an ambush position allowing free rotation of the rotary input member to a blocking position preventing further rotation of the rotary input member. In this way, the shuttle prevents rotation of a rotary input member during an overload of a control surface.

20 Claims, 14 Drawing Sheets

(56) References Cited

U.S. PATENT DOCUMENTS

| | | | |
|---|---|---|---|
| 8,312,783 B2 * | 11/2012 | McKay | 74/89.39 |
| 2008/0041178 A1 * | 2/2008 | Ozsoylu et al. | 74/425 |
| 2008/0093505 A1 | 4/2008 | Ortega de Miguel et al. | |
| 2010/0096498 A1 * | 4/2010 | McKay | 244/99.2 |

\* cited by examiner

SHUTTLE STOP FORCE LIMITER

RELATED APPLICATIONS

This application claims the benefit of U.S. Provisional Application No. 61/154,476 filed Feb. 23, 2009, which is hereby incorporated herein by reference.

FIELD OF INVENTION

The present invention relates generally to actuation systems, and more particularly to an aircraft flight control actuation system.

BACKGROUND

Modern aircraft wings often include a series of movable flight control surfaces, such as flaps or slats that can be selectively extended or retracted to modify the lift producing characteristics of the wings. Extension and retraction of such flaps or slats is accomplished by a flight control actuation system mounted in the wing.

A typical actuation system includes a series of actuators spaced along the span of each wing, and operably connected to move one or more individual flight control surfaces. Adjacent actuators are connected to each other by drive shafts to form a chain of actuators and shafts extending along the span of the wing. A power drive unit (PDU) connected to the inboard end of the chain provides motive power for driving the actuators to selectively extend or retract the flight control surfaces.

Because control surfaces such as flaps or slats significantly alter the lift producing characteristics of the wings, and because it is desirable to control the weight of the aircraft, the actuation systems have had features for reacting to problems such as jamming or failure of one of the actuators or drive shafts in the aircraft flight control system. The actuators have included, for example, a force limiting device that limits the amount of force that can be applied to the control surface and further causes stalling of the PDU to prevent movement of the other control surfaces.

SUMMARY OF INVENTION

The present invention provides an actuator characterized by the use of a shuttle that shifts in response to an overload. The shuttle is movable axially relative to a rotary input member by continued rotation of the rotary input member so that a stop on the shuttle moves from an ambush position allowing free rotation of the rotary input member to a blocking position preventing further rotation of the rotary input member. In this way, the shuttle can be used to prevent rotation of a rotary input member during an overload of a control surface, thereby preventing damage to the actuator or aircraft.

Accordingly, an actuator includes a housing, a worm gear mounted in the housing for rotation, a rotary input member mounted in the housing for rotatably driving the worm gear, and a shuttle are provided. The shuttle may be moveable by loads acting on the actuator from a disengaged position allowing free rotation of the rotary input member to an engaged position engaging the rotary input member. When in the engaged position, the shuttle is movable axially relative to the rotary input member by continued rotation of the rotary input member so that a stop on the shuttle moves from an ambush position allowing free rotation of the rotary input member to a blocking position preventing further rotation of the rotary input member.

The shuttle may include at least one tooth disposed on the shuttle that is configured to engage the rotary input member in the engaged position. Additionally or alternatively, the shuttle may include at least one frame supported on the worm shaft for relative movement. The at least one frame may include a pair of frames respectively assembled at opposite ends of the rotary input member and held together by springs.

Moreover, the shuttle may further include a base, a deflection member coupled to the base, and at least one tooth coupled to the deflection member for engaging the rotary input member in respective valleys of a thread of the rotary input member, wherein the deflection member allows the at least one tooth to move to accommodate a peak of the thread of the rotary input member if aligned therewith at the time of engagement. Additionally or alternatively, the rotary input member may include a thread. The thread may include at least one stop that is configured to engage the stop on the shuttle when the shuttle is in the blocking position.

According to a further aspect of the invention, a method is provided for limiting an amount of force applied to a control surface on an aircraft wing, the control surface being operatively coupled to an actuator, the actuator including a housing, a rotary input member mounted in the housing for driving a worm gear, and a shuttle moveable by loads acting on the actuator from a disengaged position allowing free rotation of the rotary input member to an engaged position engaging the rotary input member. The method may include the step of displacing the worm gear when an overload occurs, wherein displacement of the worm gear causes an outer member of the worm gear to contact the shuttle, thereby causing the shuttle to engage the rotary input member. The method may further include the step of moving the shuttle axially relative to the rotary input member by continued rotation of the rotary input member so that a stop on the shuttle moves from an ambush position allowing free rotation of the rotary input member to a blocking position preventing further rotation of the rotary input member.

The foregoing and other features of the invention are hereinafter described in greater detail with reference to the accompanying drawings.

DETAILED DESCRIPTION

Figure 1:
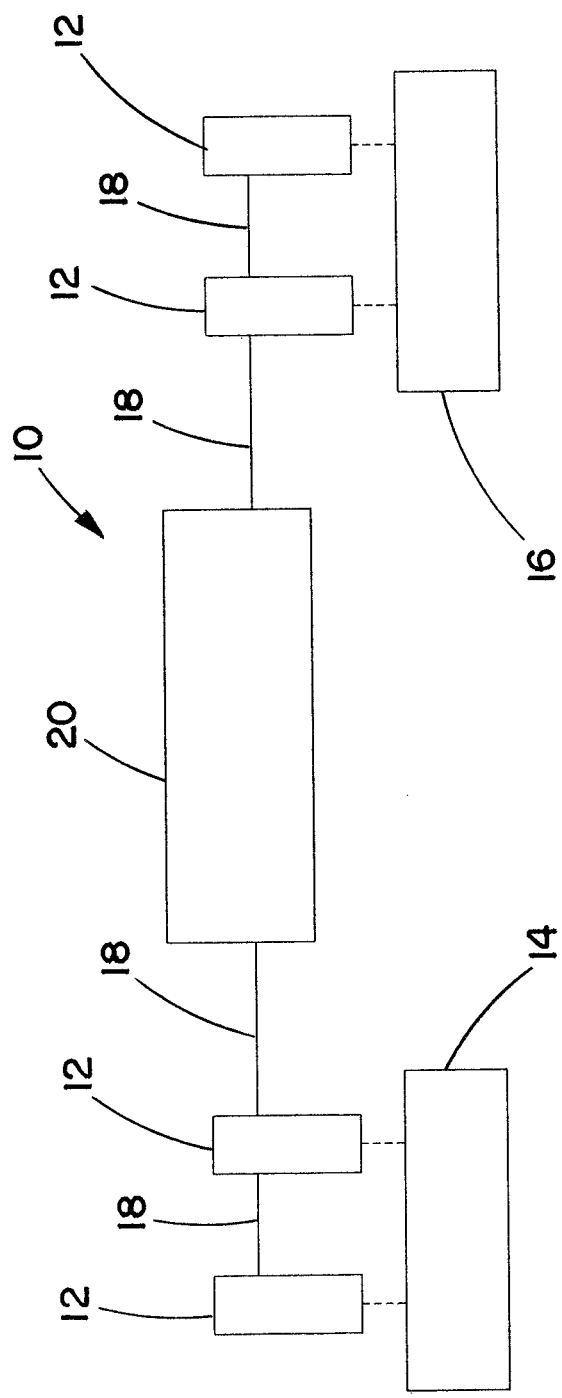
FIG. 1 is a schematic plan view of a flap control system for an aircraft.

Referring now in detail to the drawings and initially to FIG. 1, an exemplary flap system 10 can be seen to comprise four flap actuators 12 for driving two flap panels 14 and 16. As will be appreciated, the number of flap panels and actuators may be varied for a given application, but usually there will be one or more flap panels on each wing and a like number on the other wing. Each flap panel may be driven by one or more actuators 12. In the illustrated embodiment, the flap panels 14 and 16 are driven by two actuators each. It will also be appreciated that the principles of the invention may be applied to any system where linear mechanical actuators are used and load limiting is required, and the use herein of the term control surface panel is intended to encompass any type of controlled item including but not limited to; flaps, slats, doors, stabilizers and other similar devices. The following description, however, will refer to flap panels, it being appreciated that such description is equally applicable to any controlled item requiring load limiting.

Figure 2:
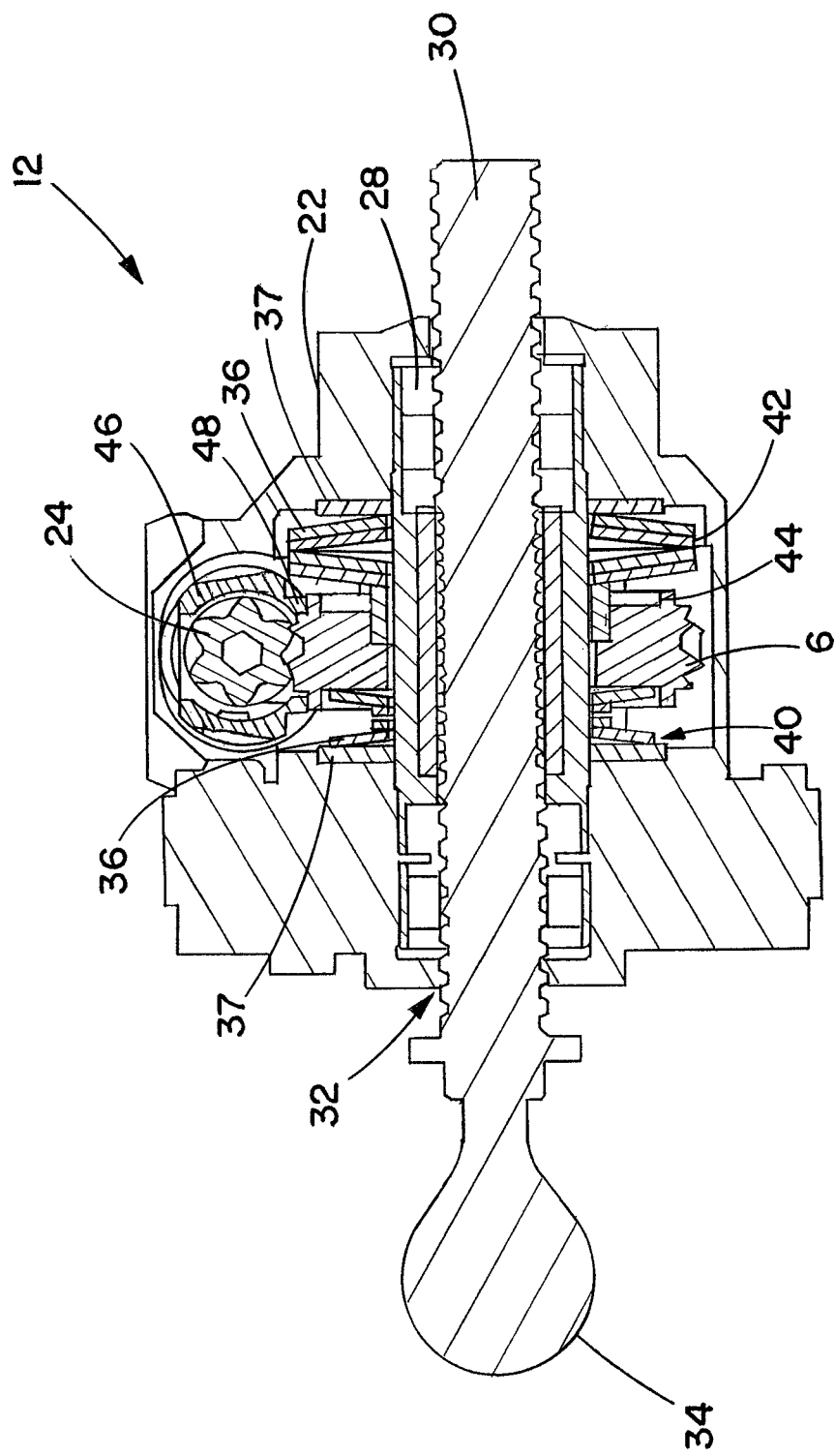
FIG. 2 is a cross-sectional view of an exemplary actuator according to the present invention taken substantially about line 2-2 of FIG. 3.
Figure 3:
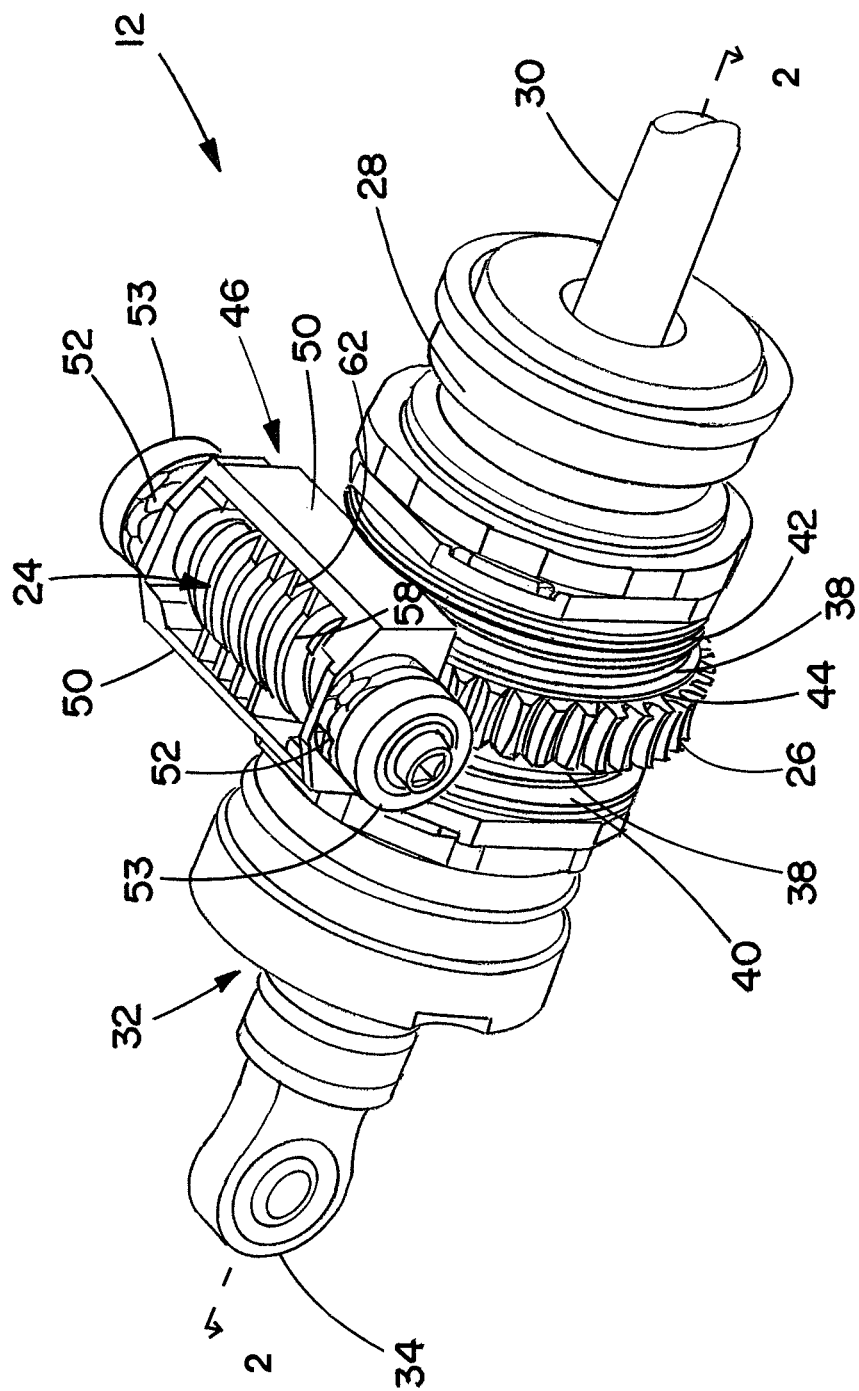
FIG. 3 is a perspective view of the exemplary actuator of FIG. 2 showing an exemplary shuttle in a disengaged position.

Referring now to FIGS. 2 and 3, each actuator 12 includes a housing 22 in which a rotary input member 24, such as a worm shaft, is mounted for rotatably driving a worm gear 26. When the actuator is assembled into the system 10, the rotary input member 24 will be connected to a drive shaft 18 whereby it can be rotatably driven by the power drive unit (PDU) 20 in one or either direction.

The rotary input member 24 is meshed with the worm gear 26, which is coupled to an actuating member 28, such as a ball nut, or any other member configured to effect movement of the control surface panel. The actuating member 28 and an output member 30, such as a ball screw, may form a ball screw and nut assembly 32, whereby rotation of the actuating member 28 effects linear movement of the output member. The ball screw and nut assembly 32 may be of a conventional design, wherein recirculating balls cause the output member 30 to translate linearly. The output member 30 has provided on an end thereof a suitable coupling, such as the illustrated attachment eye 34, for connecting to the control surface panel.

The actuating member 28 is supported for rotation in the housing by suitable bearings. The worm gear 26 is coupled to the actuating member 28 for common axial movement as well as rotary movement. In the illustrated embodiment, the actuating member 28 includes a flange that couples the worm gear 26 to the actuating member 28.

The worm gear 26 is held in an axial null, i.e. centered, position by opposing, preloaded resilient members, such as a tension spring pack 40 and a compression spring pack 42. The spring packs 40 and 42 are provided on each side of the worm gear 26 normally to hold the worm gear 26 in mesh with the rotary input member 24 except when the actuator experiences an overload. Each spring pack 40, 42 may include a spring 36, such as a Belleville spring, a plate 37, and a snap ring (not shown). The springs 36 are configured to be compressed to a prescribed value and the plates 37 are configured to carry the worm gears meshing thrust loads.

Figure 4:
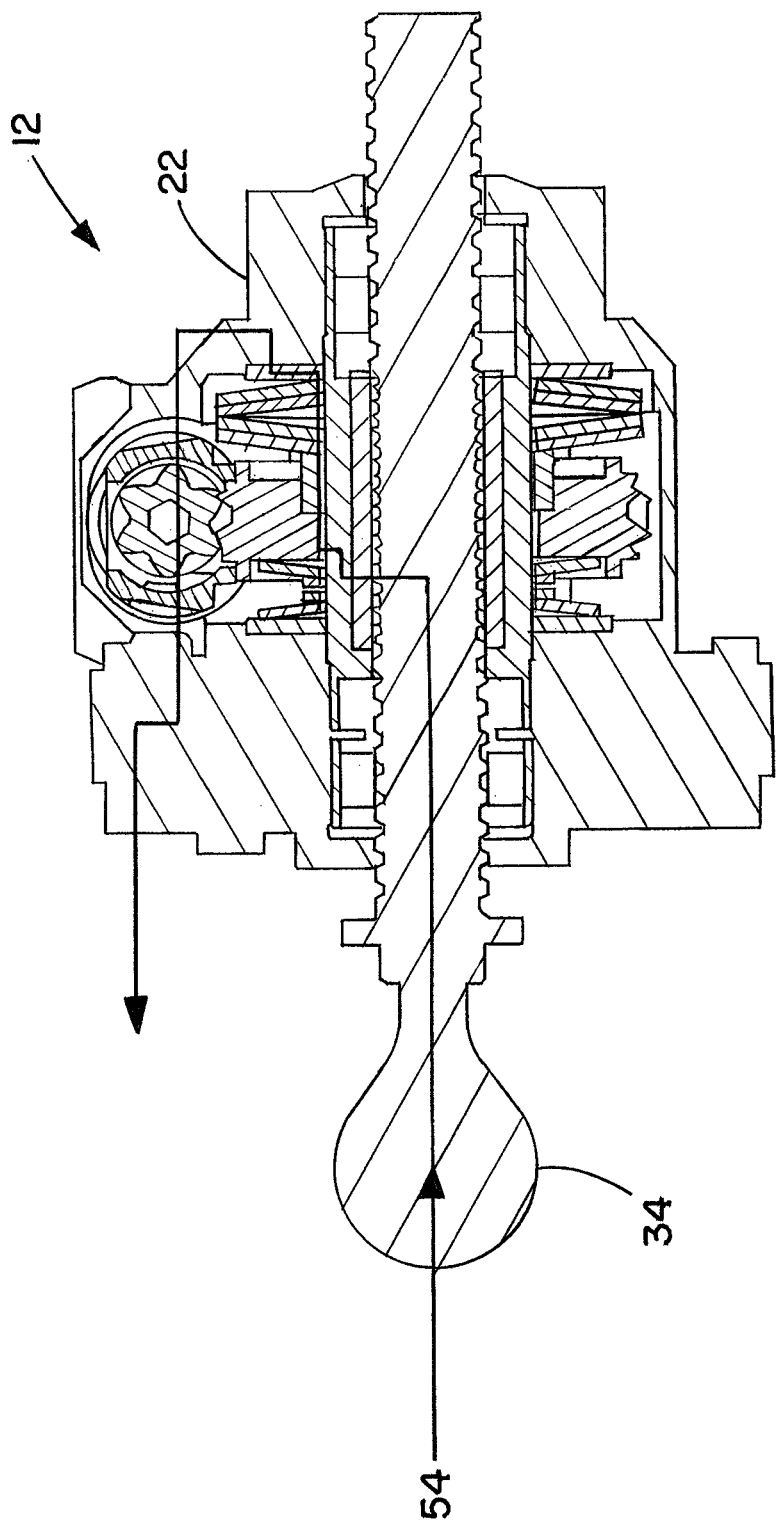
FIG. 4 is the same as FIG. 2 but showing a compression load path in the exemplary actuator.
Figure 5:
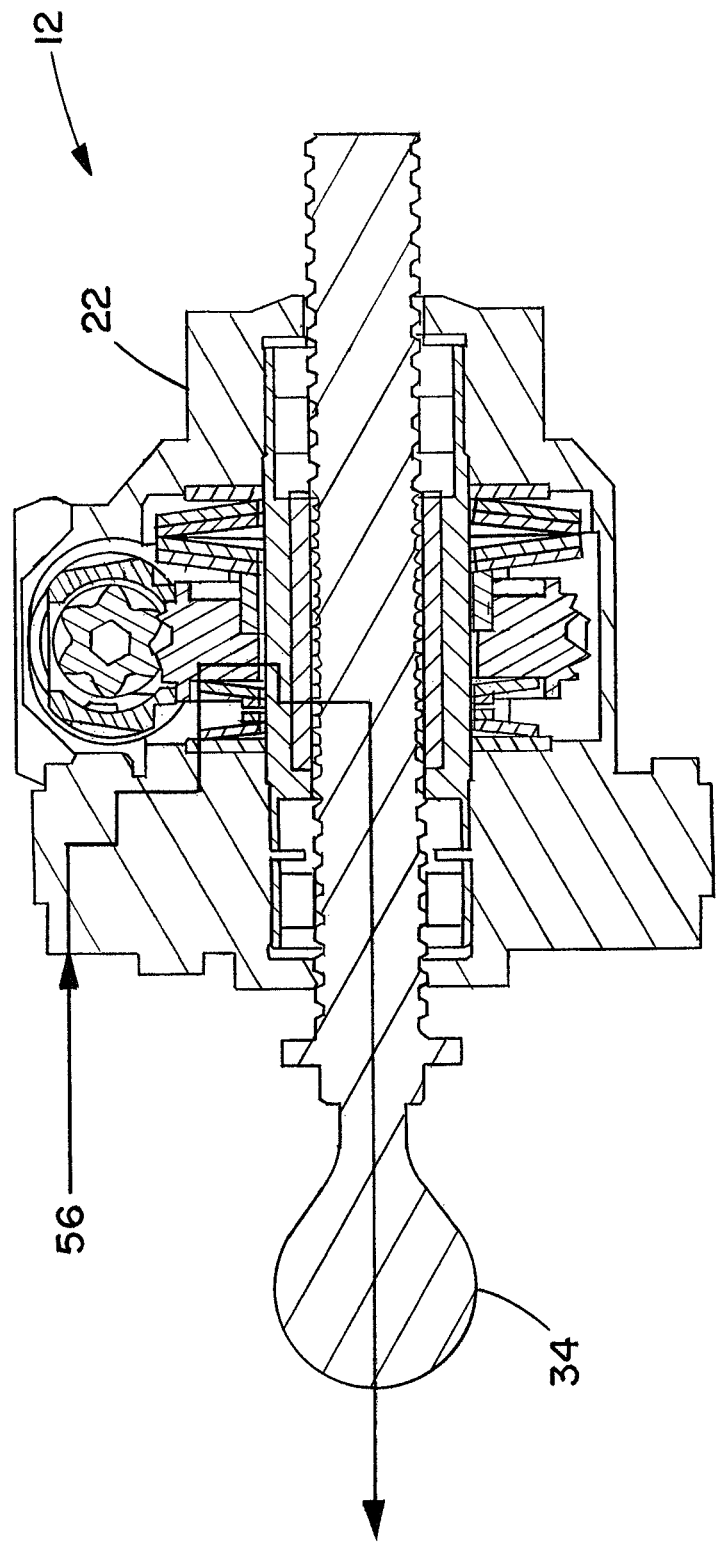
FIG. 5 is the same as FIG. 2 but showing a tension load path in the exemplary actuator.

Accordingly, to prevent the worm gear 26 from moving axially during normal operation, the spring pack disks 40 and 42 can be preloaded to prescribed values. The tension spring pack 40 may be compressed to a prescribed value (preload) for a tension load and the compression spring pack 42 compressed to a prescribed value (preload) for a compression load. The spring pack disks are prevented from moving until the prescribed values are exceeded, for example by the snap rings disposed on an outer side of the springs 36. In this way, when a load is applied under normal operating conditions, the spring pack disks 40 and 42 do not move, thereby holding the worm gear 26 at a center point so that a shuttle 46 does not engage the rotary input member 24. When the prescribed value (preload) of one of the spring pack disks 40 or 42 is exceeded during an overload, the spring pack disk 40 or 42 compacts, thereby causing the worm gear to move axially. The load path during an overload for compression loads is illustrated in FIG. 4, where the load path from the output screw fitting 34 to the actuator housing 22 is shown at 54. The load path during an overload for tension loads is illustrated in FIG. 5, where the load path from the output screw fitting 34 to the actuator housing 22 is shown at 56.

Referring now to the shuttle 46 in detail, FIG. 3. illustrates the shuttle 46, which is supported in a rotationally-fixed position relative to the rotary input member 24. The shuttle 46 is biased towards a central position by suitable resilient means, such as springs 52. The springs, in particular, may be multi-wave springs provided around each end of the rotary input member 24. The springs 52 are configured to allow the rotary input member 24 to rotate without interference, prevent the shuttle 46 from vibrating out of position, and also to allow the shuttle to translate axially along the rotary input member 24. To hold the springs 52 and the worm shaft 24 in place, bearings 53 are provided around each end of the worm shaft 24.

The shuttle 46 may include at least one frame 50 supported on the rotary input member 24 for relative movement. In the illustrated embodiment, the shuttle includes a pair of frames 50. The frames 50 form a cage around the rotary input member 24, one frame 50 being for extend and one for retract. The frames 50 may be made of any suitable material, such as bronze. It will be appreciated that although the shuttle 46 is shown as including two frames 50, the shuttle may be formed by any number of members configured to operate in a similar manner as shown.

Figure 6:
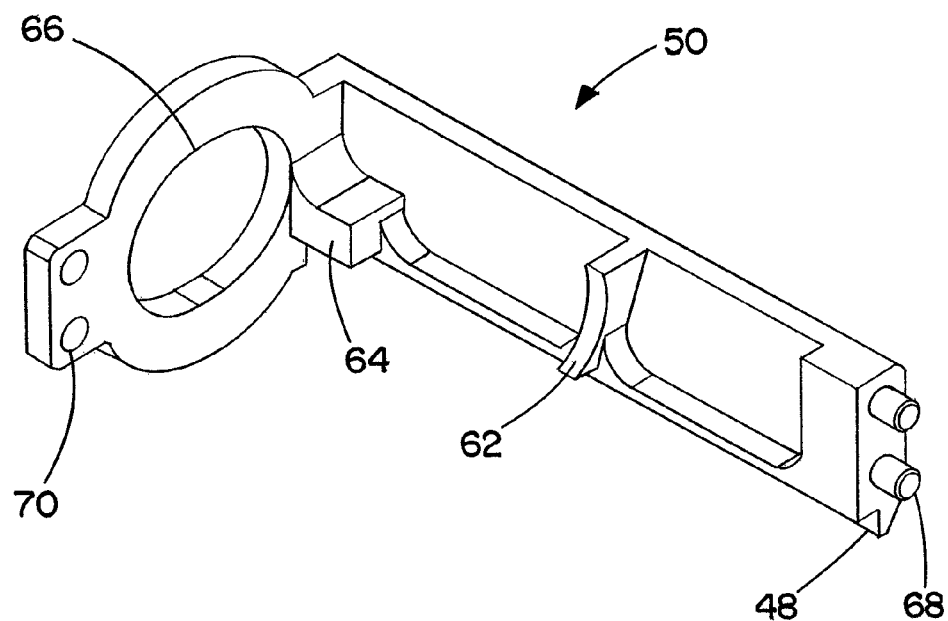
FIG. 6 is a perspective view of a frame of the exemplary shuttle of FIG. 2.

Referring now to FIG. 6, each frame 50 includes a hole 66, pins 68 and holes 70. Each hole 66, such as an elongated hole, is configured to receive an end of the rotary input member 24, and may be ovular in shape, elliptical in shape, etc. The holes 66 allow the shuttle to translate normal to a screw axis, constrain the shuttle along a vertical axis that is perpendicular to the output member 30, and prevent rotation about an output member axis. The two frames 50 may be coupled to each other by pins 68 that are received in corresponding holes 70 on the other frame, and the frames may be held together by springs 52. It will be appreciated that the frames 50 may also be coupled by any other suitable fastener, such as screws, and may be removably coupled or fixed together.

Also included on a bottom portion of each frame 50 is a foot 48. The foot 48, which may be a plurality of feet, may run the length of the frame 50 and extend toward the ball screw and nut assembly 32. The foot 48 straddles the respective spring pack disks 40 and 42 and fits closely to the disk 40, 42 on a vertical axis to prevent the shuttle 46 from translating along a screw axis and rotating about a worm axis. During an overload, a lip 44 of a respective shuttle pusher 38 contacts the foot 48 to move the shuttle 46. The shuttle pushers 38 are disposed on each side of the worm gear 26 and are configured to rotate with the worm gear 26, as shown in FIG. 3. Alternatively, the shuttle pushers 38 may be integrally formed with the worm gear 26, as shown in FIG. 2.

Figure 7:
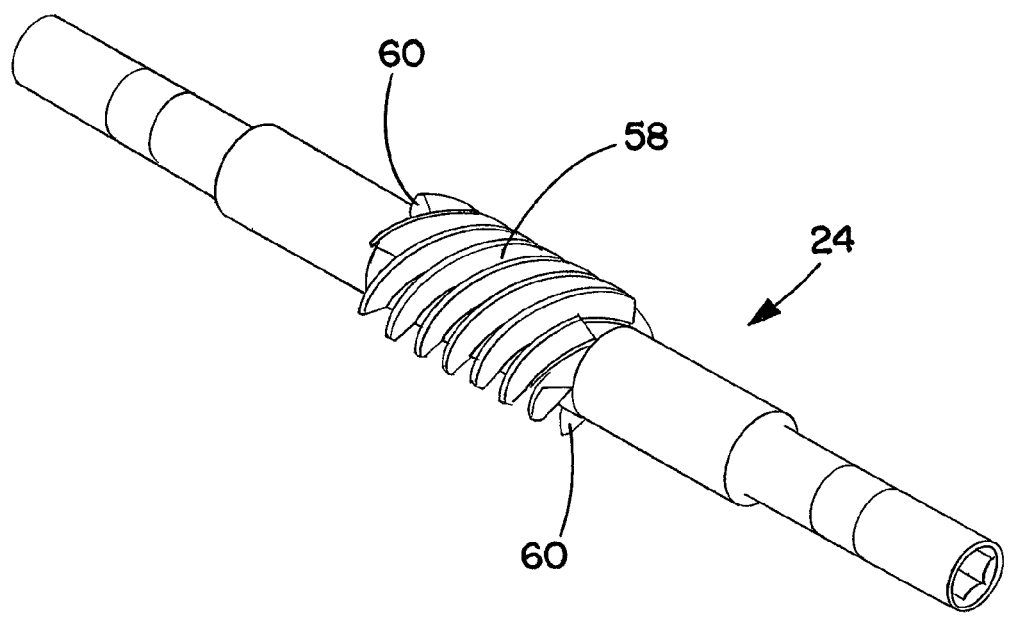
FIG. 7 is a perspective view of an exemplary rotary input member.

Referring now to FIGS. 6 and 7, the rotary input member 24 and the frame 50 of the shuttle 46 are shown. As shown in FIG. 7, the rotary input member 24 includes a thread 58 and at least one stop 60. The thread 58, such as a helical thread flight, is disposed on an outer surface of the rotary input member 24 and extends axially along the rotary input member 24. Stops 60 are disposed at each end of the thread 58, wherein the stops 60 may be formed by milling ends of the thread 58 square. As shown in FIG. 6, the shuttle 46, and in particular each frame 50 of the shuttle, includes at least one tooth 62 and at least one stop 64. The at least one tooth 62 is disposed on an inner wall of the frame 50 and the at least one stop 64 is axially spaced from the at least one tooth 62. The tooth 62 is configured to engage the thread 58 of the rotary input member 24 in an engaged position during an overload. The stop 64 is configured to contact the stop 60 on the thread 58 in a blocking position without jamming. The at least one tooth 62 may be in a variety of forms although preferably the tooth is angled at the pitch angle of the rotary input member 24.

Figure 8:
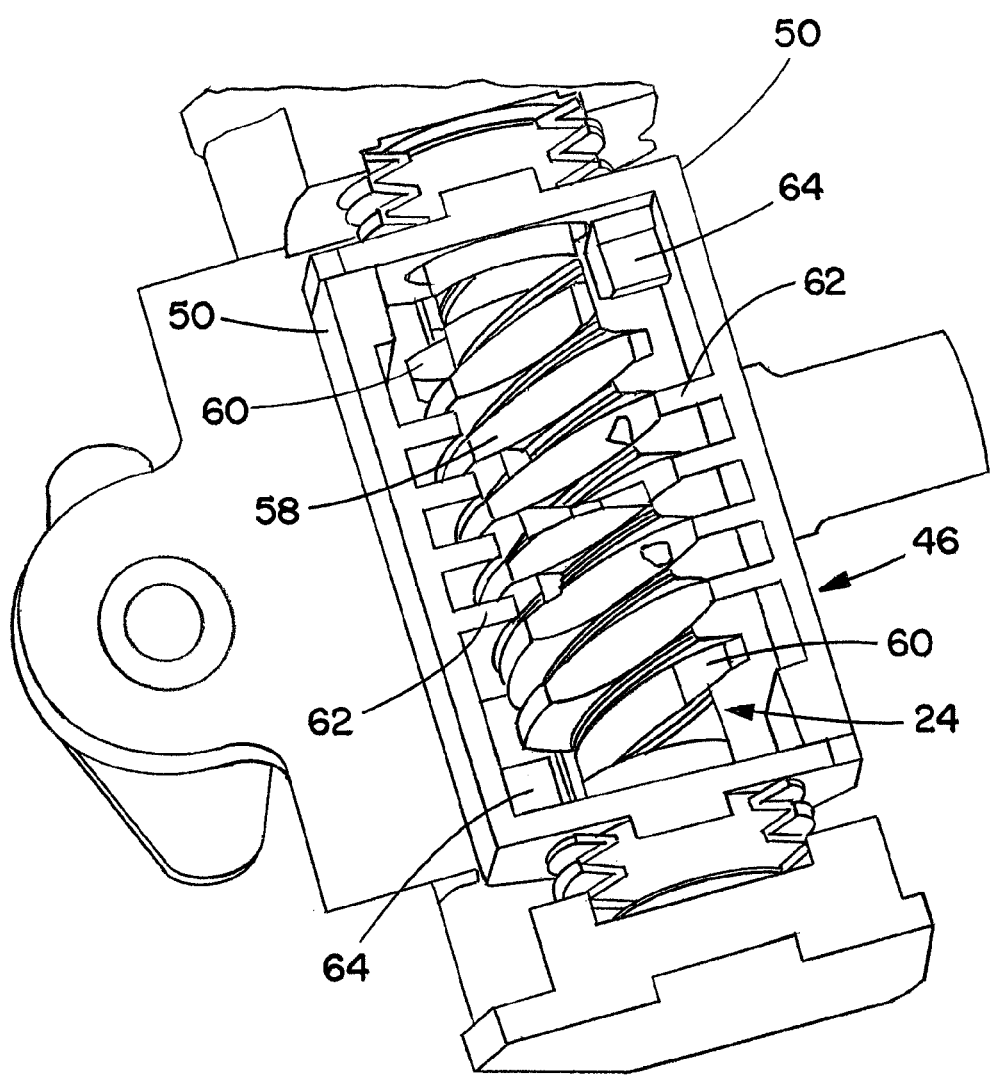
FIG. 8 is a bottom view of the actuator of FIG. 2 showing the shuttle in an engaged position and a stop on the shuttle in an ambush position.

When an overload occurs, for example, during a wind gust, a change in an angle of attack, speed increase, driveline failure, etc., the prescribed value that the spring pack 40 or 42 is loaded to will be exceeded, causing the spring pack 40 or 42 to compact axially along the output member 30. Such axial movement causes the shuttle pusher 38, actuating member 28 and worm gear 26 to move axially. When this occurs, the lip 44 on the shuttle pusher 38 will contact the corresponding foot 48 of the shuttle 46. This causes the shuttle 46 to be moved from a disengaged position allowing free rotation of the rotary input member 24 to an engaged position engaging the rotary input member 24. In the engaged position, the tooth 62 engages the thread 58 to hold the shuttle 46 in the engaged position, as shown in FIG. 8. When the shuttle 46 is in the engaged position, the shuttle 46 is movable axially relative to the rotary input member 24 by continued rotation of the rotary input member 24 so that the at least one stop 64 on the shuttle moves from an ambush position allowing free rotation of the rotary input member 24 to the blocking position preventing further rotation of the rotary input member 24. In the blocking position, the stop 64 engages with the stop 60, instantly stopping the actuator.

When the overload is relieved, the spring pack 40 or 42 expands back to its original position, which causes the lip 44 to come out of contact with the foot 48. The stops 60 and 64 can then disengage and the tooth 62 move out of the engaged position. The springs 52 can then move the shuttle 46 back to the ambush position. Once the stops 60 and 64 disengage, the actuator 12 will begin operating again. This can be accomplished automatically, although the PDU 20 may be turned off to allow the system to reset or the system reversed to back out of the load.

As will now be appreciated, the foregoing construction allows an actuator 12 to be stopped to prevent damage to the components in the actuator. In this manner, the shuttle acts as a force limiting device that provides a stopping force that directly opposes torque and that does not rely on friction coefficients. The forces acting on the force limiting device are relatively low.

Referring now to FIGS. 9-14, another exemplary embodiment of an actuator is shown. The actuator 112 is substantially the same as the above-referenced actuator 12, but another shuttle 146 in accordance with the invention is shown. Consequently, the same reference numerals, but indexed by 100 are being used to denote structures corresponding to similar structures in the actuator 112. In addition, the foregoing description is equally applicable to the actuator 112 except as noted below.

Figure 9:
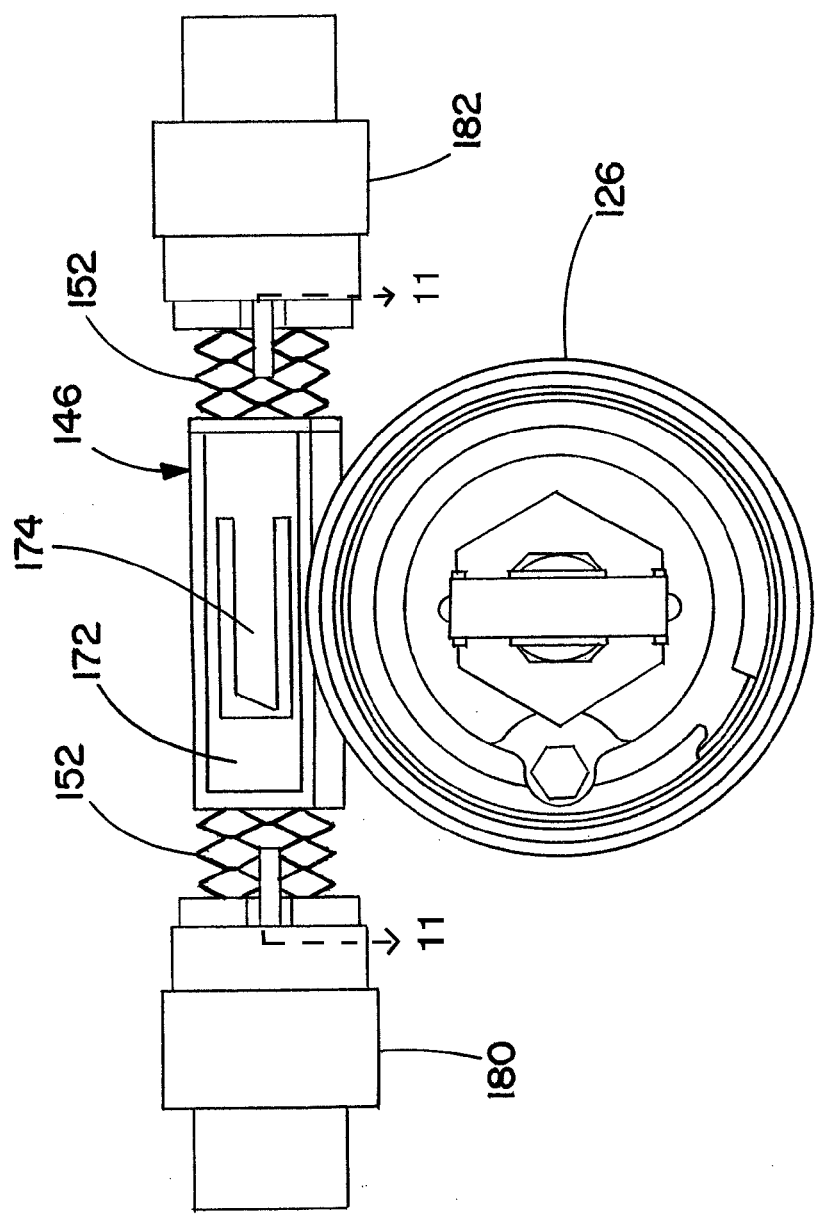
FIG. 9 is an end view of the actuator but showing another shuttle in accordance with the invention.

FIG. 9 is an end view of an exemplary shuttle 146 for the actuator 112. As illustrated, the rotary input member 124 is in mesh with the worm gear 126 and the shuttle 146 is supported in a rotationally-fixed condition relative to the rotary input member 124. The shuttle 146 includes a base 172 and a deflection member 174. The deflection member 174, which may be a cantilever arm or other suitable member, extends in a direction parallel to the rotary input member 124. The base 172 may be formed by a wall extending parallel to the deflection member 174, wherein the deflection member resides in a plane in the wall in its unflexed position.

Figure 10:
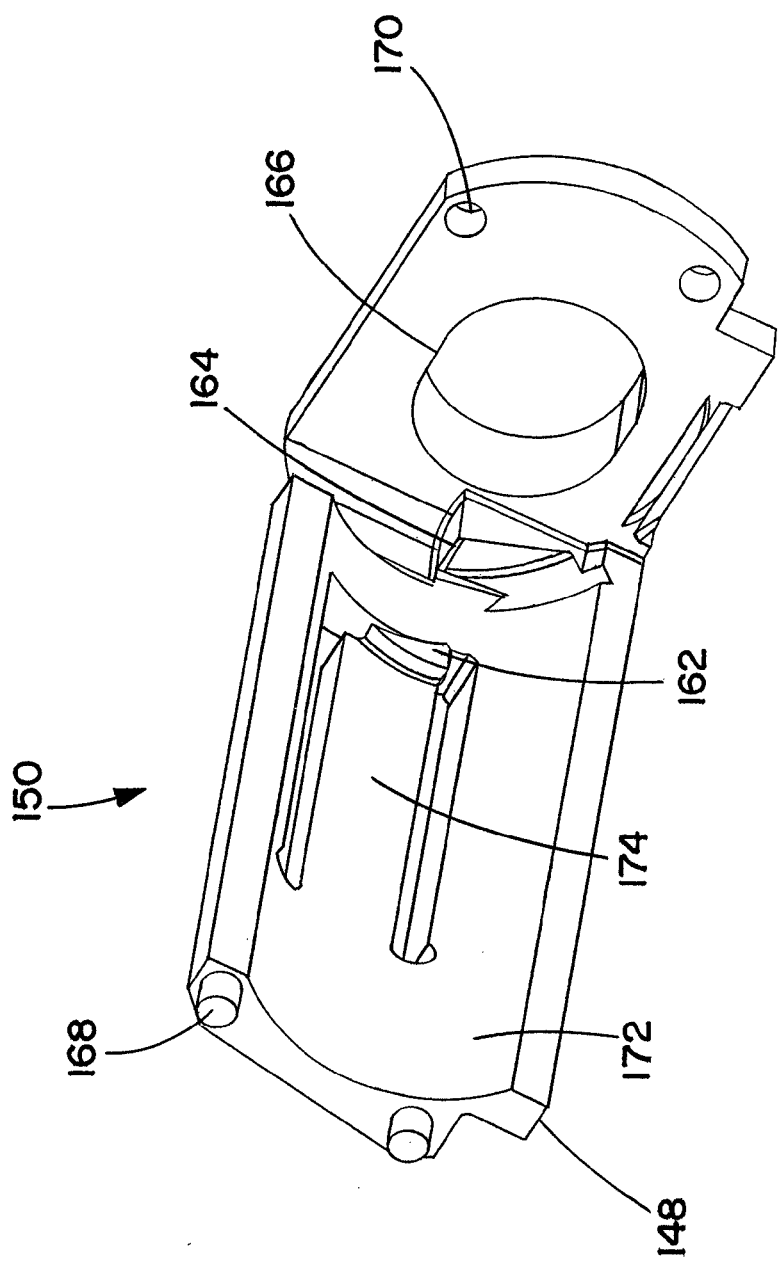
FIG. 10 is a perspective view of a frame of the exemplary shuttle of FIG. 9.
Figure 11:
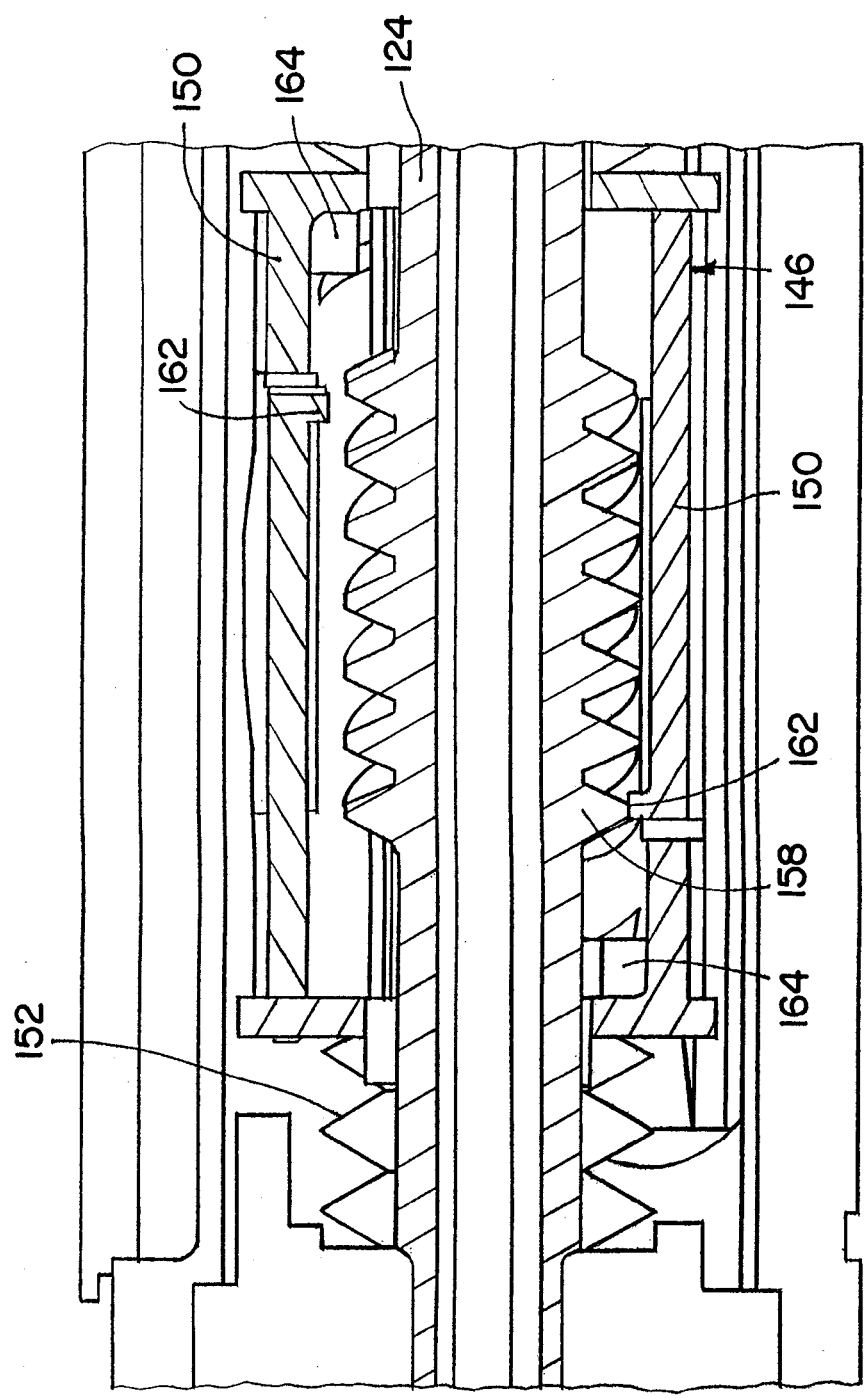
FIG. 11 is a fragmentary cross-sectional view of the actuator of FIG. 9 taken substantially along line 11-11 showing a tooth of the shuttle contacting a peak of a thread.
Figure 12:
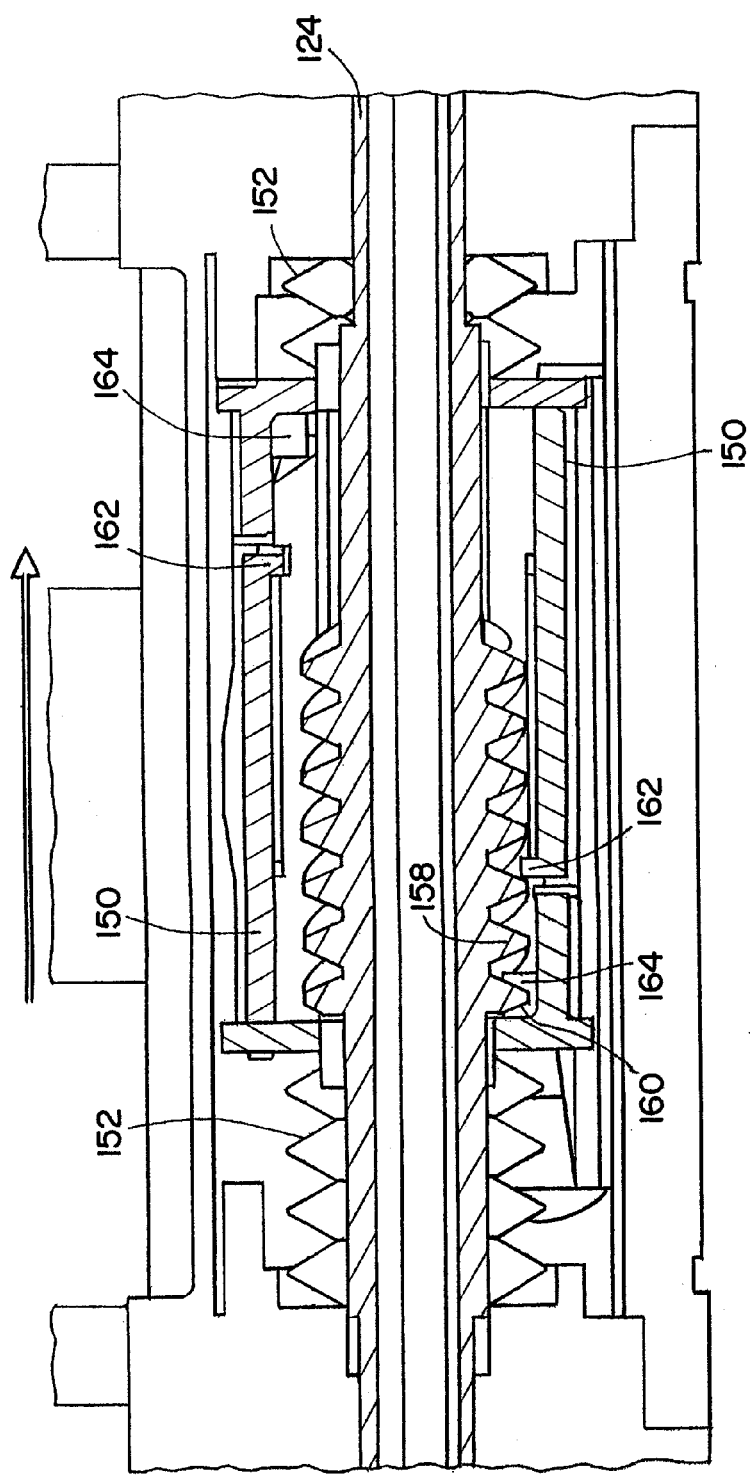
FIG. 12 is a fragmentary cross-sectional view of the actuator of FIG. 9 taken substantially along line 11-11 showing the shuttle in a blocking position.

The shuttle also includes at least one tooth 162, shown in FIG. 10, coupled to the deflection member 174 for engaging the rotary input member 124 in respective valleys of the thread 158 of rotary input member 124. When the actuator 112 is overloaded statically, for example by wind gusts, changes in angle of attack, speed increases, driveline failure, etc., the at least one tooth 162 may come in contact with a peak of the thread 158 rather than meshing with the thread 158, as shown in FIG. 11. If this occurs, the deflection member 174 allows the tooth 162 to move to accommodate a peak of the thread 158 of the rotary input member 124 if aligned therewith at the time of engagement to maintain acceptable stress levels. In this way, the deflection member 174 may allow the tooth 162 to avoid plastic deformation. The deflection member 174 may also be sufficiently stiff to balance springs loads without deflecting over the peak of the thread 158 during dynamic overloads. FIG. 12 illustrates the shuttle 146 wherein the tooth 162 has moved to accommodate the peak of the thread 158 to then become engaged with the thread 158 so that the stop 164 could engage with the stop 160.

Figure 13:
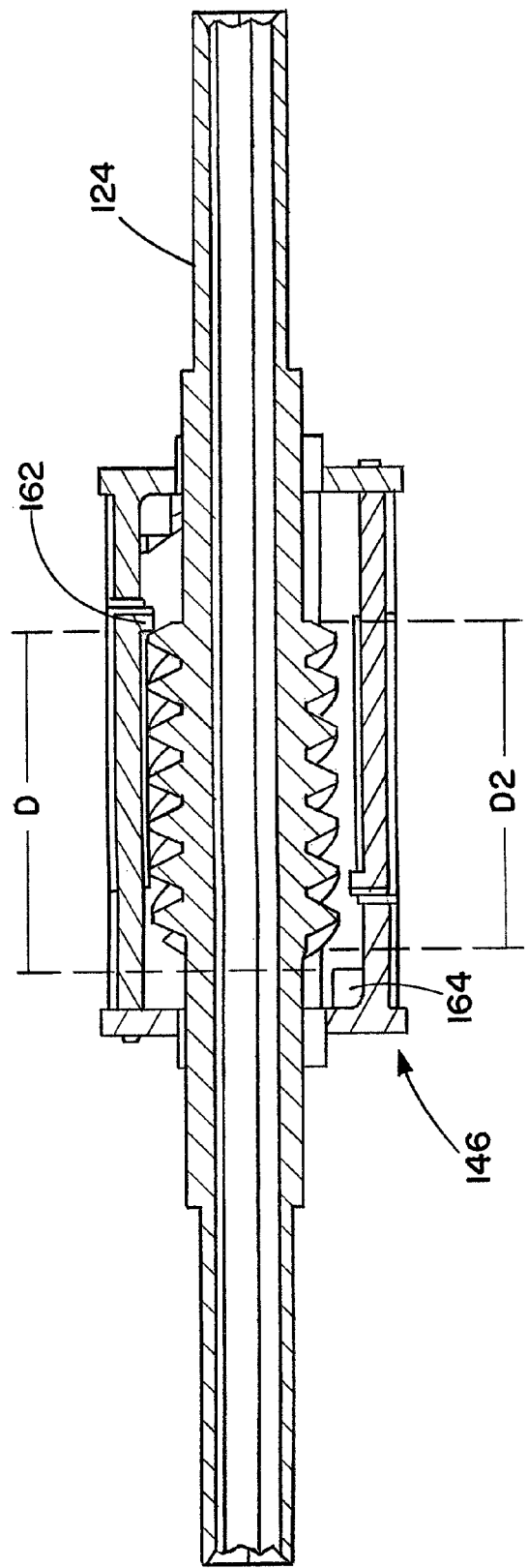
FIG. 13 is fragmentary cross-sectional view of the actuator of FIG. 9 taken substantially along line 11-11 showing an aiding load override.

Referring now to FIG. 13, a fragmentary cross-sectional view of the actuator 112 is shown during an aiding load override. As illustrated, the distance D between the tooth 162 on the top frame and the stop 164 on the bottom frame is greater than the distance D2 of the thread 158 on the rotary input member 124. This configuration prevents the rotary input member 124 from causing the frames 150 to separate. This configuration is advantageous when the load is going in the same direction as the actuator. The flaps are able to retract because the load on the flaps is lowering and the actuator would not be able to generate this type of load due to a jam.

Figure 14:
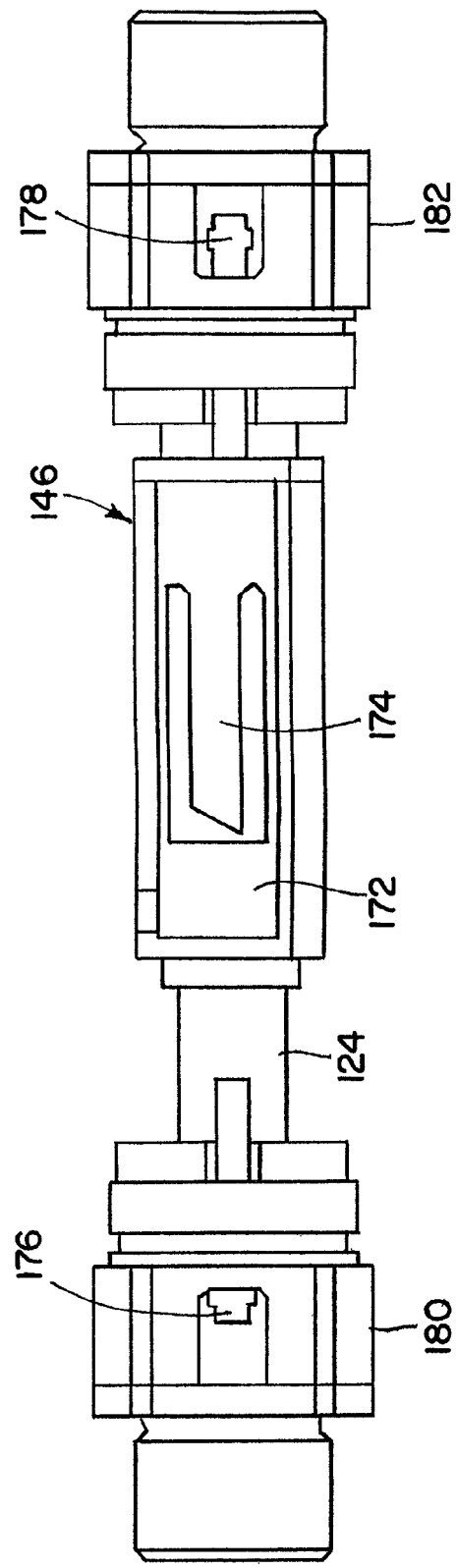
FIG. 14 shows the shuttle of FIG. 9 with an overload indicator.

Referring now to FIG. 14, an overload indicator for an exemplary actuator 112 is shown. When one or more actuators are overloaded due to a jam or aerodynamic overload, for example, the actuator(s) will stop. Often, however, the problem is not reproducible on the ground. The overload indicator allows an aircraft operator to determine the occurrence of an overload and which actuator(s) was overloaded when troubleshooting a system failure. To do so, each actuator includes at least one pin in a recessed position, as shown by pin 176. In the exemplary embodiment, two pins 176 and 178 are provided; each being disposed in a respective housing 180, 182 surrounding respective ends of the rotary input member 124. The pins 176 and 178 are configured to be displaced when the shuttle 146 translates axially along the rotary input member 124 during an overload. The pins are held in place by the friction of o-rings that form a seal between the pins and the housings. The friction that holds the pins in place is sufficient to withstand the pressure differentials caused by altitude and temperature change.

When the shuttle 146 translates axially, the shuttle 146 generates enough force to displace a pin from the recessed position, and because of friction, the pin will remain in that position. Therefore, when the aircraft operator is inspecting the actuators 112 while troubleshooting the system, if one of the pins has been displaced, the aircraft operator is provided with a non-volatile record that the actuator has experienced an overload. Further, the operator can determine which direction the overload occurred depending on which pin has been displaced. For example, as shown, the shuttle 146 has translated to the right, causing the pin 178 to be displaced out of the recessed position. Accordingly, the operator can determine that an overload occurred and that the overload occurred in the direction on the right side of FIG. 14.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An actuator including:
   a housing;
   a worm gear mounted in the housing for rotation;
   a rotary input member mounted in the housing for rotatably driving the worm gear; and
   a shuttle supported in the housing for movement by loads acting on the actuator from a disengaged position allowing free rotation of the rotary input member to an engaged position engaging the rotary input member, wherein when in the engaged position, the shuttle is configured to be moved axially relative to the rotary input member by continued rotation of the rotary input member so that a stop on the shuttle moves from an ambush position allowing free rotation of the rotary input member to a blocking position preventing further rotation of the rotary input member,
   wherein during an overload, the worm gear is configured to displace axially relative to an output member to contact the shuttle, thereby causing the shuttle to engage the rotary input member.

2. An actuator according to claim 1, wherein the shuttle includes at least one tooth disposed on the shuttle that is configured to engage the rotary input member in the engaged position.

3. An actuator according to claim 2, wherein the stop is axially spaced from the at least one tooth.

4. An actuator according to claim 2, wherein the shuttle includes at least one frame supported on the rotary input member for relative movement.

5. An actuator according to claim 4, wherein the at least one frame including a pair of frames respectively assembled at opposite ends of the rotary input member and held together by springs.

6. An actuator according to claim 1, wherein the shuttle is biased towards a central position by springs, thereby preventing the shuttle from vibrating out of position and allowing the shuttle to translate axially along the rotary input member.

7. An actuator according to claim 1, wherein the worm gear includes a pusher integrally formed on each side of the worm gear, wherein the pushers are configured to contact the shuttle during an overload.

8. An actuator according to claim 1, further including first and second spring packs disposed on opposite sides of the worm gear, wherein the spring packs are configured to hold the worm gear in mesh with the rotary input member and to compress during an overload to cause the worm gear to displace.

9. An actuator according to claim 1, further including a nut rotated by the worm gear and the output member restrained by the actuating member.

10. An actuator according to claim 1, wherein the rotary input member includes a thread.

11. An actuator according to claim 1, further comprising at least one pin disposed in a pin housing surrounding an end of the rotary input member, wherein the at least one pin is configured to displace from a recessed position during an overload.

12. An actuator according to claim 11, further comprising at least one second pin disposed in a housing surrounding another end of the rotary member.

13. An actuator including:
    a housing;
    a worm gear mounted in the housing for rotation;
    a rotary input member mounted in the housing for rotatably driving the worm gear; and
    a shuttle supported in the housing for movement by loads acting on the actuator from disengaged position allowing free rotation of the rotary input member to an engaged position engaging the rotary input member, wherein when in the engaged position, the shuttle is configured to be moved axially relative to the rotary input member by continued rotation of the rotary input member so that a stop on the shuttle moves from an ambush position allowing free rotation of the rotary input member to a blocking position preventing further rotation of the rotary input member,
    wherein the shuttle includes at least one tooth disposed on the shuttle that is configured to engage the rotary input member in the engaged position,
    wherein the shuttle includes at least one frame supported on the rotary input member for relative movement, the at least one frame including a pair of frames respectively assembled at opposite ends of the rotary input member and held together by springs.

14. An actuator including:
    a housing;
    a worm gear mounted in the housing for rotation;
    a rotary input member mounted in the housing for rotatably driving the worm gear; and
    a shuttle supported in the housing for movement by loads acting on the actuator from a disengaged position allowing free rotation of the rotary input member to an engaged position engaging the rotary input member, wherein when in the engaged position, the shuttle is configured to be moved axially relative to the rotary input member by continued rotation of the rotary input member so that a stop on the shuttle moves from an ambush position allowing free rotation of the rotary input member to a blocking position preventing further rotation of the rotary input member, and wherein the shuttle includes a base, an arm coupled to the base, and at least one tooth coupled to the arm and configured to engage the rotary input member in respective valleys of a thread of the rotary input member, wherein the arm allows the at least one tooth to move to accommodate a peak of the thread of the rotary input member if aligned therewith at the time of engagement.

15. An actuator according to claim 14, wherein the stop is axially spaced from the arm.

16. An actuator according to claim 14, wherein the arm is a cantilever arm extending in a direction parallel to the rotary input member.

17. An actuator according to claim 16, wherein the base is formed by a wall extending parallel to the cantilever arm, wherein the cantilever arm resides in a plane in the wall in its unflexed position.

18. An actuator including:
a housing;
a worm gear mounted in the housing for rotation;
a rotary input member mounted in the housing for rotatably driving the worm gear, the rotary input member including a thread; and
a shuttle supported in the housing for movement by loads acting on the actuator from a disengaged position allowing free rotation of the rotary input member to an engaged position engaging the rotary input member, wherein when in the engaged position, the shuttle is moveable axially relative to the rotary input member by continued rotation of the rotary input member so that a stop on the shuttle moves from an ambush position allowing free rotation of the rotary input member to a blocking position preventing further rotation of the rotary input member, wherein the thread includes at least one stop that is configured to engage the stop on the shuttle when the shuttle is in the blocking position.

19. An actuator according to claim 18, wherein the shuttle includes at least one tooth disposed on the shuttle that is configured to engage the rotary input member in the engaged position.

20. An actuator according to claim 19, wherein the stop is axially spaced from the at least one tooth.

* * * * *